United States Patent [19]

Udagawa

[11] Patent Number: 5,538,263
[45] Date of Patent: *Jul. 23, 1996

[54] METAL LAMINATE GASKET WITH EDGE SUPPORT SHIMS

[75] Inventor: Tsunekazu Udagawa, Ichikawa, Japan

[73] Assignee: Ishikawa Gasket Co., Ltd., Tokyo, Japan

[ * ] Notice: The term of this patent shall not extend beyond the expiration date of Pat. No. 5,427,389.

[21] Appl. No.: 133,389

[22] Filed: Oct. 8, 1993

[30] Foreign Application Priority Data

Oct. 16, 1992 [JP] Japan .................. 4-078499 U

[51] Int. Cl.⁶ .................................. F16J 15/08
[52] U.S. Cl. .................................. 277/235 B
[58] Field of Search ................ 277/180, 233, 277/235 B

[56] References Cited

U.S. PATENT DOCUMENTS

| | | | |
|---|---|---|---|
| 4,962,939 | 10/1990 | Lönne et al. | 277/235 B |
| 4,995,624 | 2/1991 | Udagawa et al. | 277/235 B |
| 5,082,298 | 1/1992 | Uchida et al. | |
| 5,118,121 | 6/1992 | Hellman, Sr. | 277/180 X |
| 5,427,389 | 6/1995 | Ishikawa et al. | 277/235 B |

FOREIGN PATENT DOCUMENTS

| | | |
|---|---|---|
| 0468526 A1 | 1/1992 | European Pat. Off. . |
| 0544215 A1 | 6/1993 | European Pat. Off. . |
| 2668542 A1 | 4/1992 | France . |
| 188955 | 12/1984 | Japan .................. 277/235 B |

*Primary Examiner*—Scott W. Cummings
*Attorney, Agent, or Firm*—Kanesaka & Takeuchi

[57] ABSTRACT

A metal laminate gasket of the invention is used for an internal combustion engine formed of a cylinder head and a cylinder block. The gasket is basically formed of two metal plates laminated together. The gasket has a rectangular shape, and includes a plurality of cylinder bores arranged in a longitudinal direction of the gasket, and a plurality of bolt holes arranged to surround the cylinder bores. The gasket has two lateral side portions, each being defined between a lateral edge and a line linking centers of bolt holes located adjacent to the lateral edge. Edge support shims are installed between the plates at the lateral side portions to substantially completely support tightening pressure of the bolts applied to the lateral side portions. Thus, deformation of the cylinder head is prevented, and substantially equal tightening pressure can be formed around the entire cylinder bores.

3 Claims, 1 Drawing Sheet

METAL LAMINATE GASKET WITH EDGE SUPPORT SHIMS

BACKGROUND OF THE INVENTION AND RELATED ART STATEMENT

The present invention relates to a metal laminate gasket with edge support shims to prevent upward expansion or deformation of a cylinder head of an engine.

In an engine having a plurality of cylinder bores arranged in one or a longitudinal direction, a plurality of bolt holes is arranged to surround the respective cylinder bores to tightly seal therearound. A gasket to be installed in this engine includes a plurality of sealing means around the cylinder bores, at which high surface pressure is formed when the gasket is tightened.

When the gasket is tightened between a cylinder head and a cylinder block by bolts, sealing means situated around the respective cylinder bores are compressed. In this respect, a bolt located in a middle portion of the engine operates to tighten two, i.e. right and left, longitudinal sides of the sealing means relative to the bolt. However, a bolt at the longitudinal end of the engine operates to tighten only one side of the sealing means, not two sides. Thus, the bolts at the longitudinal ends operate to tighten the sealing means at a pressure generally twice as much as that at the middle portion of the sealing means.

The unbalanced tightening pressure causes the middle portion of the cylinder head to project upwardly. As a result, equal sealing pressure is not obtained at the sealing means.

In U.S. Pat. No. 4,776,073, a gasket is provided with two kinds of surface pressure regulation plates installed around different holes to be sealed.

In U.S. Pat. No. 5,215,316, a gasket for an open deck type engine is provided with a thin metal plate, which is located above a main body to surround a water passage situated between cylinder walls and the main body. The thin metal plate provides surface pressure outside the entire water passage.

In the conventional gasket, a thin metal plate is installed around a hole to be sealed to provide high surface pressure around the hole. However, the thin metal plate is not used for other purposes.

Accordingly, one object of the invention is to provide a metal laminate gasket, which can provide by tightening bolts substantially equal surface pressure to all sealing means formed around the cylinder bores.

Another object of the invention is to provide a metal laminate gasket as stated above, which can substantially prevent deformation of a cylinder head caused by unbalanced surface pressure on the sealing means.

A further object of the invention is to provide a metal laminate gasket as stated above, which can be easily and economically manufactured.

Further objects and advantages of the invention will be apparent from the following description of the invention.

Summary of the Invention

In accordance with the present invention, a metal laminate gasket is used for an internal combustion engine formed of a cylinder head and a cylinder block. The gasket is basically formed of two metal plates laminated together.

The gasket has a rectangular shape, and includes a plurality of cylinder bores arranged along a longitudinal direction of the gasket, and a plurality of bolt holes arranged to surround the cylinder bores. The gasket has two lateral side portions, each being defined between the lateral edge extending substantially perpendicularly to the longitudinal direction of the gasket and a line linking centers of bolt holes located adjacent to the lateral edge.

In the gasket of the invention, two edge support shims are sandwiched between the two plates to be disposed substantially at the respective lateral side portions. The edge support shims substantially completely support the tightening pressure of the bolts applied to the lateral side portions of the gasket to thereby prevent deformation of the cylinder head and provide substantially equally tightening pressure around the entire cylinder bores.

In this respect, if the edge support shims are not formed at the lateral side portions, the lateral side portions are strongly compressed by the bolts. Thus, the middle portion of the cylinder head is liable to project upwardly. Thus, the sealing means for the cylinder bores can not be compressed equally, and gas leakage may occur.

In the present invention, since the deformation of the cylinder head is well prevented, the sealing means can be substantially completely compressed. Gas leakage is thus well prevented.

The edge support shim may include two shim side portions extending along longitudinal edges of the gasket parallel to the longitudinal direction of the gasket. The shim side portions extend from the lateral side portion to a middle portion of the gasket not to exceed a line extending perpendicularly to the longitudinal direction of the gasket and passing through a center of one cylinder bore located adjacent to the edge support shim. As a result, the shim side portions do not affect the surface pressure obtained by other bolts.

The edge support shims of the invention are situated at portions affected only by bolts at lateral ends of the gasket. The cylinder head can be substantially equally tightened.

DETAILED DESCRIPTION OF PREFERRED EMBODIMENTS

Figure 1:
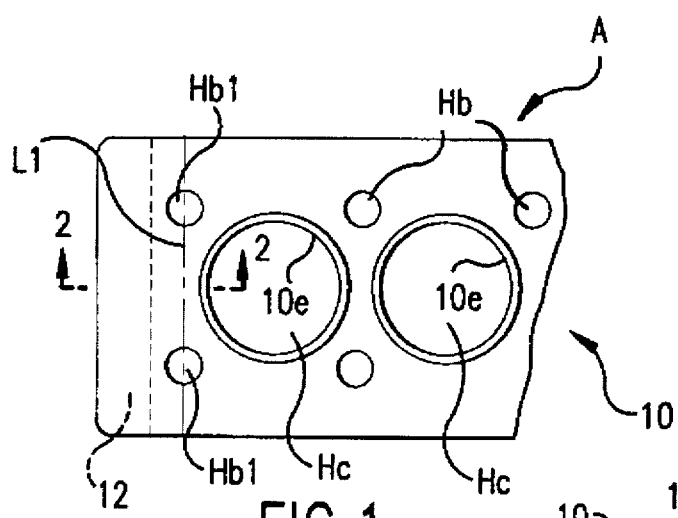
FIG. 1 is an explanatory partial plan view of a first embodiment of a metal laminate gasket of the invention.
Figure 2:
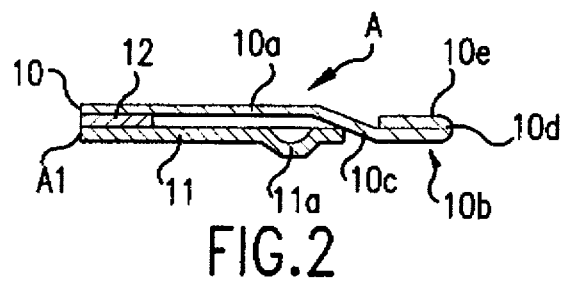
FIG. 2 is an enlarged section view taken along a line 2—2 in FIG. 1.

Referring to FIGS. 1 and 2, a metal laminate gasket A of the invention is shown. The gasket A is a cylinder head gasket and includes a plurality of linearly extending cylinder bores Hc, water holes (not shown), oil holes (not shown), bolt holes Hb, Hb1, and so on, as in the conventional gasket.

The gasket A is formed of an upper plate 10 and a lower plate 11, which extend substantially throughout an entire area of the engine to be installed. The upper plate 10 includes a base portion 10a, an inner portion 10b around the cylinder bore Hc, and an inclined portion 10c between the base portion 10a and the inner portion 10b. The inner portion 10b includes a curved portion 10d to define the cylinder bore Hc, and a flange 10e.

The lower plate 11 includes a hole larger than the inner portion 10b, and a bead 11a around the hole. The bead 11a is located outside the inclined portion 10c.

When the gasket A is situated between a cylinder head and a cylinder block (both not shown) and is tightened, the inner portion 10b is non-resiliently compressed, while the inclined portion 10c and the bead 11a are resiliently compressed to seal around the cylinder bore Hc.

In the gasket A, the cylinder bores Hc are arranged linearly along a longitudinal direction, and the bolt holes Hb, Hb1 are arranged to surround the cylinder bores Hc. In this engine, when the gasket A is tightened, each bolt (not shown) inserted in the bolt hole Hb provides surface pressure for sealing two cylinder bores, while each bolt (not shown) inserted in the bolt hole Hb1 provides surface pressure for sealing only one cylinder bore.

If the gasket A is tightened at the same torque by the bolts, the surface pressure formed around the bolt hole Hb becomes nearly half of the surface pressure formed around the bolt hole Hb1. Namely, the two lateral side portions of the cylinder head gasket A are tightened stronger than the middle portion of the gasket.

In the above case, the middle portion of the cylinder head has a space relative to the cylinder block greater than that at the lateral side portions of the cylinder head. Namely, the middle portion of the cylinder head slightly projects upwardly. Since the cylinder head deforms slightly as stated above, the sealing means for the cylinder bores can not receive equal surface pressure.

In the present invention, in order to provide equal surface pressure even at the bolts around the bolt holes Hb1, edge support shims 12 are situated between the plates 10, 11 at the lateral side portions of the gasket A. The lateral side portion is a portion surrounded between an edge A1 and a line L1 linking between two bolt holes Hb1 near the edge A1.

The thickness of the shim 12 is substantially the same as that of the plates 10, 11. However, the thickness of the shim 12 may be less than that of the plates 10, 11. The shims 12 are fixed to the plates 10, 11 by spot welding.

Since the edge support shims 12 are located at the lateral side portions, the tightening pressure by the bolts in the bolt holes Hb1 is applied to the edge support shims 12 as well, so that the surface pressure by the bolts at the bolt holes Hb1 can be the same surface pressure as in the other portions.

As a result, the cylinder head is not strongly tightened at the lateral side portions thereof, and hence the cylinder head does not deform such that the middle portion projects upwardly. Thus, the sealing means can be compressed substantially equally. Gas leakage does not occur by unbalanced surface pressure of the sealing means.

Figure 3:
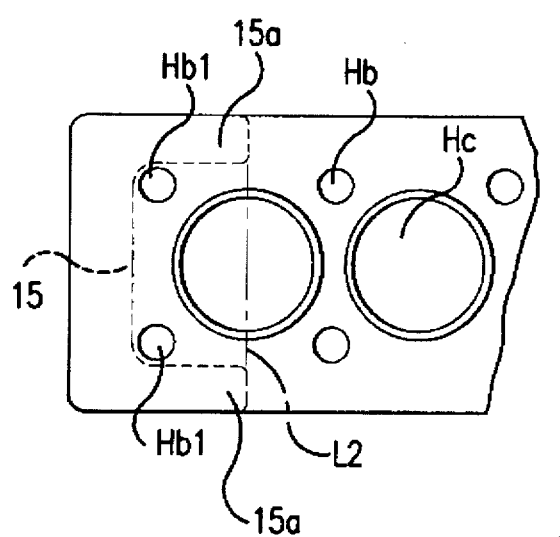
FIGS. 3 and 4 are partial plan views of second and third embodiments of the gasket of the invention.

FIG. 3 shows a gasket B formed of upper and lower plates, as in the gasket A shown in FIGS. 1 and 2. The gasket B, however, includes edge support shims 15 at lateral side portions of the gasket B. The shim 15 includes side portions 15a situated outside the bolt holes Hb1 and along the longitudinal direction of the gasket B.

The side portion 15a extends near a half distance between the bolt holes Hb and Hb1. The side portion 15a does not extend beyond a line L2, which extends through a center of the cylinder bore Hc and perpendicular to the longitudinal direction of the gasket. Because, if the side portion 15a extends beyond the line, it affects the surface pressure by the bolt inserted in the bolt hole Hb. The shims 15 operate as in the shim 12.

Figure 4:
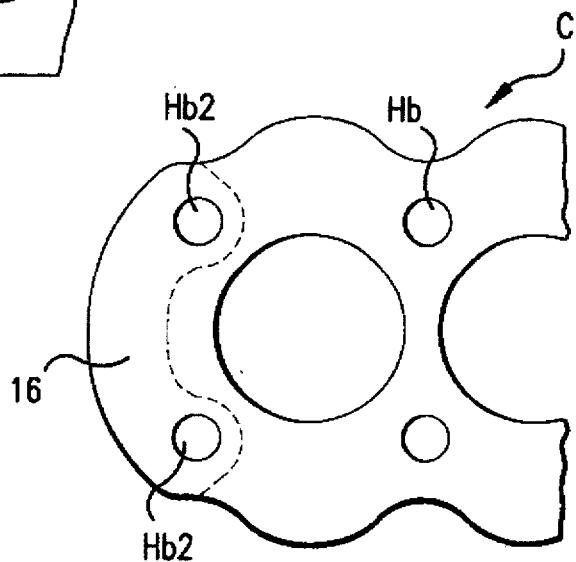

FIG. 4 shows a metal laminate gasket C formed of upper and lower plates, similar to the gasket A. In the gasket C, the side edges for constituting the gasket are curved and does not have enough spaces outside the bolt holes Hb2. Thus, shim 16 situated between the plates is curved and extends around the bolt holes Hb2. Although the shim 16 is located around the bolt holes Hb2, the shim 16 does not extend more than the portion around the bolt holes Hb2 in order not to reduce the tightening pressure at the side of the bolt hole Hb. The shim may slightly surround the bolt hole Hb2. The gasket C operates as in the gasket A.

In the present invention, the lateral side portions of the gasket can be sufficiently supported by the edge support shims. Thus, deformation of the cylinder head is prevented, and the sealing means around the cylinder bores are equally compressed to securely seal therearound.

While the invention has been explained with reference to the specific embodiments of the invention, the explanation is illustrative, and the invention is limited only by the appended claims.

What is claimed is:

1. A metal laminate gasket for an internal combustion engine formed of a cylinder head and a cylinder block, comprising:

at-least two metal plates laminated together and extending substantially throughout an entire area of the engine for constituting the metal laminate gasket, said gasket including two longitudinal edges extending along a longitudinal direction of the gasket, two lateral edges extending substantially perpendicular to the longitudinal direction to form the gasket in an elongated shape, a plurality of cylinder bores arranged along the longitudinal direction of the gasket, and a plurality of bolt holes arranged to surround the cylinder bores, said gasket having two lateral side portions, each being defined between the lateral edge and a line linking centers of bolt holes located adjacent to the lateral edge, and two edge support shims sandwiched between the two plates and disposed at and extending substantially along the respective lateral side portions, each edge support shim including a main portion situated entirely in the lateral side portion without extending outwardly therefrom and two shim side portions, each shim side portion being located in a side portion of the gasket situated along the longitudinal edge extending from the main portion not to exceed a line extending perpendicular to the longitudinal direction of the gasket and passing through a center of one of the cylinder bores located adjacent to the edge support shim, said edge support shims substantially supporting tightening pressure of the bolts applied to the lateral side portions to thereby prevent deformation of the cylinder head and provide substantially equal tightening pressure around the entire cylinder bores.

2. A metal laminate gasket according to claim 1, wherein said shim side portions are located outside the bolt holes without completely surrounding the bolt holes and extend to a portion near the line passing through the cylinder bore.

3. A metal laminate gasket according to claim 1, wherein said shim side portions extend only to portions around the bolt holes near the lateral side portion without extending to the line passing through the cylinder bore.

* * * * *

UNITED STATES PATENT AND TRADEMARK OFFICE
CERTIFICATE OF CORRECTION

PATENT NO. : 5,538,263
DATED : July 23, 1996
INVENTOR(S) : Tsunekazu Udagawa

It is certified that error appears in the above-indentified patent and that said Letters Patent is hereby corrected as shown below:

Col. 4, Claim 1, line 24, before "side", add --longitudinal--; and line 25, before "extending", add --and--.

Signed and Sealed this

Twenty-fourth Day of September, 1996

Attest:

BRUCE LEHMAN

Attesting Officer     Commissioner of Patents and Trademarks